(12) United States Patent
Piekarz

(10) Patent No.: US 7,273,199 B2
(45) Date of Patent: Sep. 25, 2007

(54) MOUNT FOR A PHONE HOLDER

(75) Inventor: Roman Piekarz, Mielec (PL)

(73) Assignee: Bury Sp. z.o.o., Mielec (PL)

( * ) Notice: Subject to any disclaimer, the term of this patent is extended or adjusted under 35 U.S.C. 154(b) by 0 days.

(21) Appl. No.: 11/533,110

(22) Filed: Sep. 19, 2006

(65) Prior Publication Data
US 2007/0075197 A1 Apr. 5, 2007

(30) Foreign Application Priority Data
Sep. 19, 2005 (DE) .................... 10 2005 044 720

(51) Int. Cl.
*F21V 21/00* (2006.01)
(52) U.S. Cl. .............................. 248/220.22; 248/309.1; 379/446; 379/454
(58) Field of Classification Search .......... 248/220.22, 248/309.1; 379/446, 449, 450, 454, 455; 224/929
See application file for complete search history.

(56) References Cited

U.S. PATENT DOCUMENTS 5,779,205 A * 7/1998 Ching ..................... 248/205.8
D481,033 S * 10/2003 Peiker ........................ D14/253
6,738,477 B1 * 5/2004 Kam ........................... 379/446

FOREIGN PATENT DOCUMENTS

| DE | 203 16 891 U1 | 12/2004 |
| EP | 1 233 598 A1 | 8/2002 |
| KR | 99058040 A * | 7/1999 |

* cited by examiner

Primary Examiner—Korie Chan
(74) Attorney, Agent, or Firm—Whitham Curtis Chrisofferson & Cook, PC

(57) ABSTRACT

A mount for a phone holder comprising a rear projecting housing part with an extension provided with contacts. An accommodating pocket for a cell phone having a recess is adjoined by a contact chamber with mating contacts. The housing part being inserted into the recess, having a displaceable wall component which bounds the recess on the side located opposite the contact chamber, which allows the housing part to be introduced into the recess. The housing part butts against a base of the recess. A covering of the contact chamber extends over the opening of the contact chamber and can be pushed down by means of the phone holder in order to release the opening of the contact chamber. Locking being activated by the locking means when the covering is in the pushed-down state.

3 Claims, 4 Drawing Sheets

MOUNT FOR A PHONE HOLDER

FIELD OF THE INVENTION

The invention relates to a mount for a phone holder which has a rear projecting housing part with an extension provided with contacts and, on its front side, an accommodating pocket for a cell phone, having a recess which is adapted for accommodating the rear housing part and is adjoined by a contact chamber which is open on one side, contains mating contacts and into which the extension of the housing part can be pushed for the contact-connection between the contacts of the latter and the mating contacts, the housing part being inserted into the recess, having a displaceable wall component which bounds the recess on the side located opposite the contact chamber, which allows the housing part to be introduced into the recess, such that the housing part butts against a base of the recess, only once the wall component has been displaced counter to a spring force and which can be blocked in terms of displaceability by a locking means in a position which corresponds to the position of the wall component with the extension inserted into the recess and pushed into the contact chamber to the contact-connection state, and having a covering of the contact chamber, which extends over the opening of the contact chamber and can be pushed down by means of the phone holder in order to release the opening of the contact chamber, locking being activated by the locking means when the covering is in the pushed-down state.

DESCRIPTION OF RELATED ART

Such a mount is known, for example, from System 8 which is marketed under the brand name THB Bury. The covering of the contact chamber here is formed by a wall which is positioned perpendicularly to the base of the recess and is connected integrally to a run-on slope which extends from the base of the recess up to the height of the covering-forming wall. By virtue of the housing part of the phone holder being inserted by way of its extension, the covering-forming wall is pushed downward via the run-on slope, so that the opening of the contact chamber is released. Pushing the run-on slope down, however, is only possible when the wall component which can be displaced with the top side of the housing part has been displaced, so that the housing part finds a recess length which allows the housing part to be inserted, by way of the extension, onto the base of the recess. In this state, the extension can be pushed into the contact chamber and it is possible to establish contact-connection of the contacts. In the contact-connected state, the wall component locks, and can no longer be displaced without an unlocking button being actuated. The phone holder is thus retained in captive fashion in the mount and can only be removed again by actuation of the unlocking button and subsequent displacement of the displaceable wall component.

The functioning of the known mount is optimum. The problem, however, is that, as a result of the wall which forms the covering of the opening of the contact chamber being displaced, a minimum overall height of the mount is necessary for the run-on slope in the downward direction (beneath the plane of the base of the recess). This minimum overall height causes problems, in particular when the mount is to be installed, for example, in a center console, in which the abovementioned minimum overall height is often not available for installation purposes.

SUMMARY

The object of the invention is thus for a mount of the abovementioned type to be formed with a lower minimum overall height, the essential functions being maintained in the process.

In order to achieve this object, a mount of the type mentioned in the introduction is characterized according to the invention in that the covering is formed by an obliquely positioned flap which is positioned in a pivotable manner on the base of the recess and by means of which the opening of the contact chamber can be released by virtue of the flap being pivoted into the plane of the base.

In the case of the mount according to the invention, the covering of the mating contacts is formed by an obliquely positioned flap, which thus performs the function of the run-on slope and that of the covering. The obliquely positioned flap is pushed into the plane of the base of the recess by the extension of the housing part of the phone holder, so that there is no need for any hitherto necessary accommodating space for a covering-forming wall beneath the base, the minimum overall height being reduced as a result.

Locking of the covering-forming flap such that the flap can only be moved if, by virtue of the wall component being displaced by means of the top side of the housing part, it is ensured that the housing part is already directed parallel to the base or butts against the base of the recess, can be dispensed with if, in a preferred embodiment, the contact chamber, which is open on one side, is dimensioned such that the extension of the housing part can only be introduced when the housing part, following displacement of the wall component, is oriented parallel to the base. Oblique introduction of the extension into the contact chamber is thus only possible to such a slight extent that there is still no contact-connection taking place between the contacts of the extension and the mating contacts of the contact chamber, so that incorrect fastening of the phone holder in the mount without locking is immediately recognizable in that the electrical function, which is transmitted via the mount to the phone holder and the cell phone inserted therein, is not ensured.

Locking of the displaceable wall component in the locked position when the housing part of the phone holder has been correctly inserted is controlled, in a preferred embodiment, by the pivoting of the flap itself.

DESCRIPTION OF THE DRAWING FIGURES

The invention will be explained in more detail hereinbelow with reference to an exemplary embodiment illustrated in the drawing, in which.

DETAILED DESCRIPTION

Figure 1:
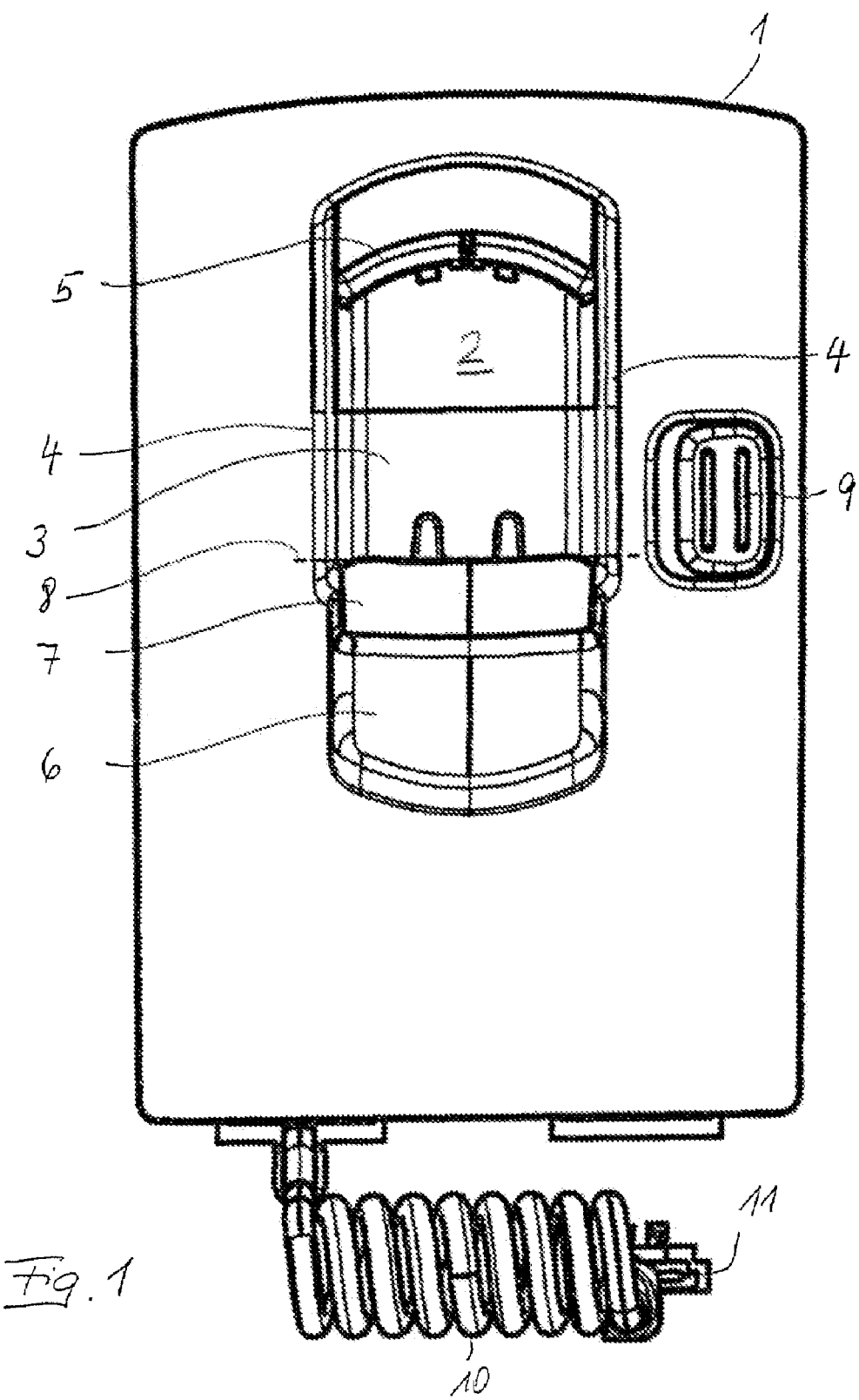
FIG. 1 shows a plan view of an embodiment of a mount according to the invention in an initial state.

That embodiment of the mount according to the invention which is illustrated in the drawing is provided for installation in a center console. It thus comprises a covering plate 1, which forms a top side and in which is located a recess 2 with a base 3 located parallel to the covering plate 1. The recess 2 is bounded, on the one hand, by parallel longitudinal side walls 4 and, on the other hand, by a top, displaceable wall component 5 and a projecting structure 6 on the opposite end side. A top side of the projecting structure 6 is located parallel to, and above, the covering plate 1. From the top side of the projecting structure 6, an obliquely positioned flap 7 extends to the base 3 of the recess 2. The flap 7 is mounted on the base such that it can be pivoted about an axis of rotation 8.

An unlocking button 9 is located alongside the recess. The mount can be connected, via a helical cable 10 and a plug 11, to a central control means, for example in a motor vehicle and, in particular, for a hands-free kit in a motor vehicle.

Figure 2:
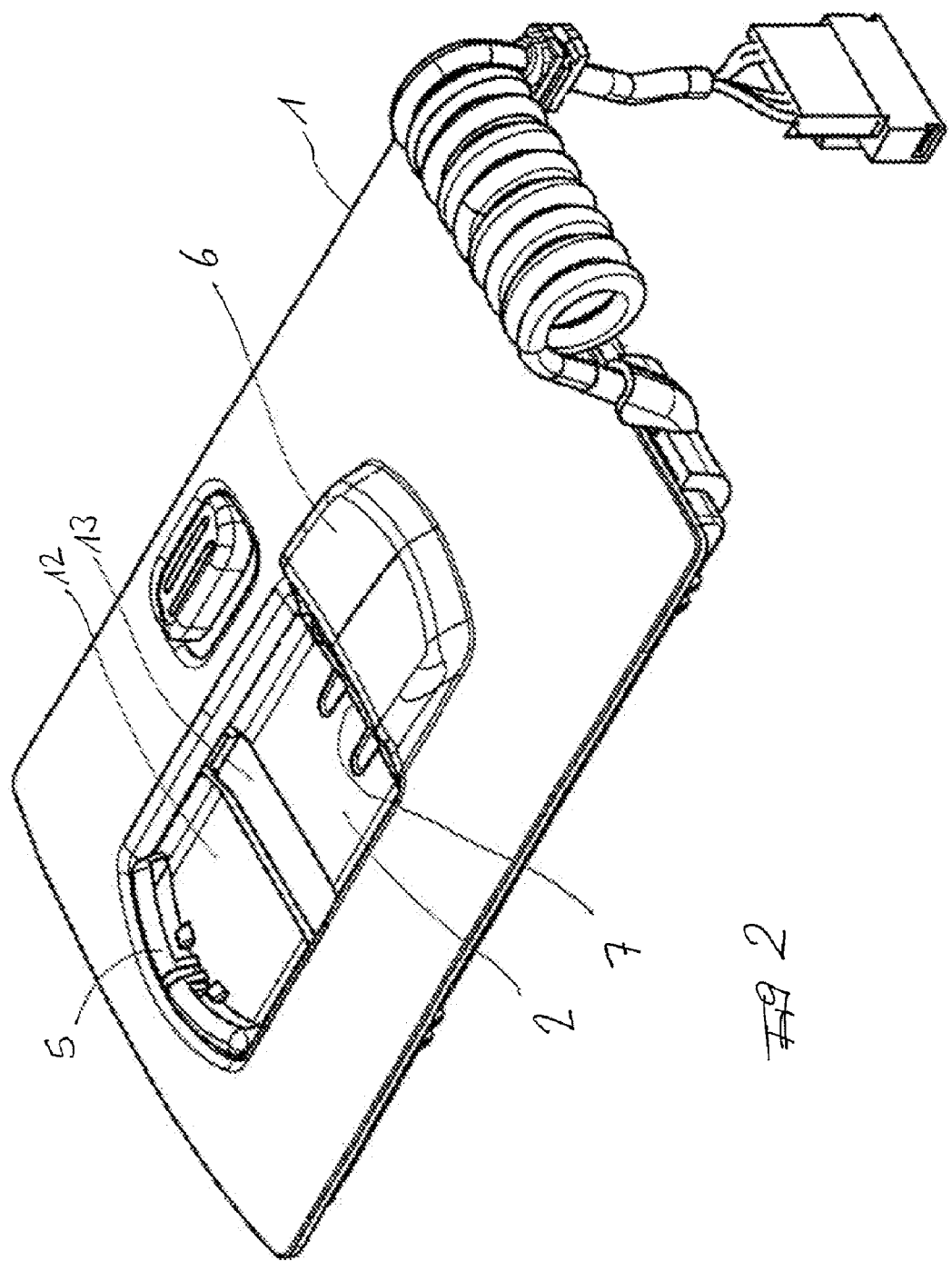
FIG. 2 shows a perspective view, obliquely from above, of the mount according to FIG. 1 following displacement of the displaceable wall component.

FIG. 2 illustrates that the displaceable wall component 5 can be displaced upward out of the initial position illustrated in FIG. 1, that is to say from the projecting structure 6, parallel to the longitudinal side walls 4, together with a base component 12 connected integrally to it, so that a gap 13 is formed between a fixed part of the base 2 and the base component 12.

Figure 3:
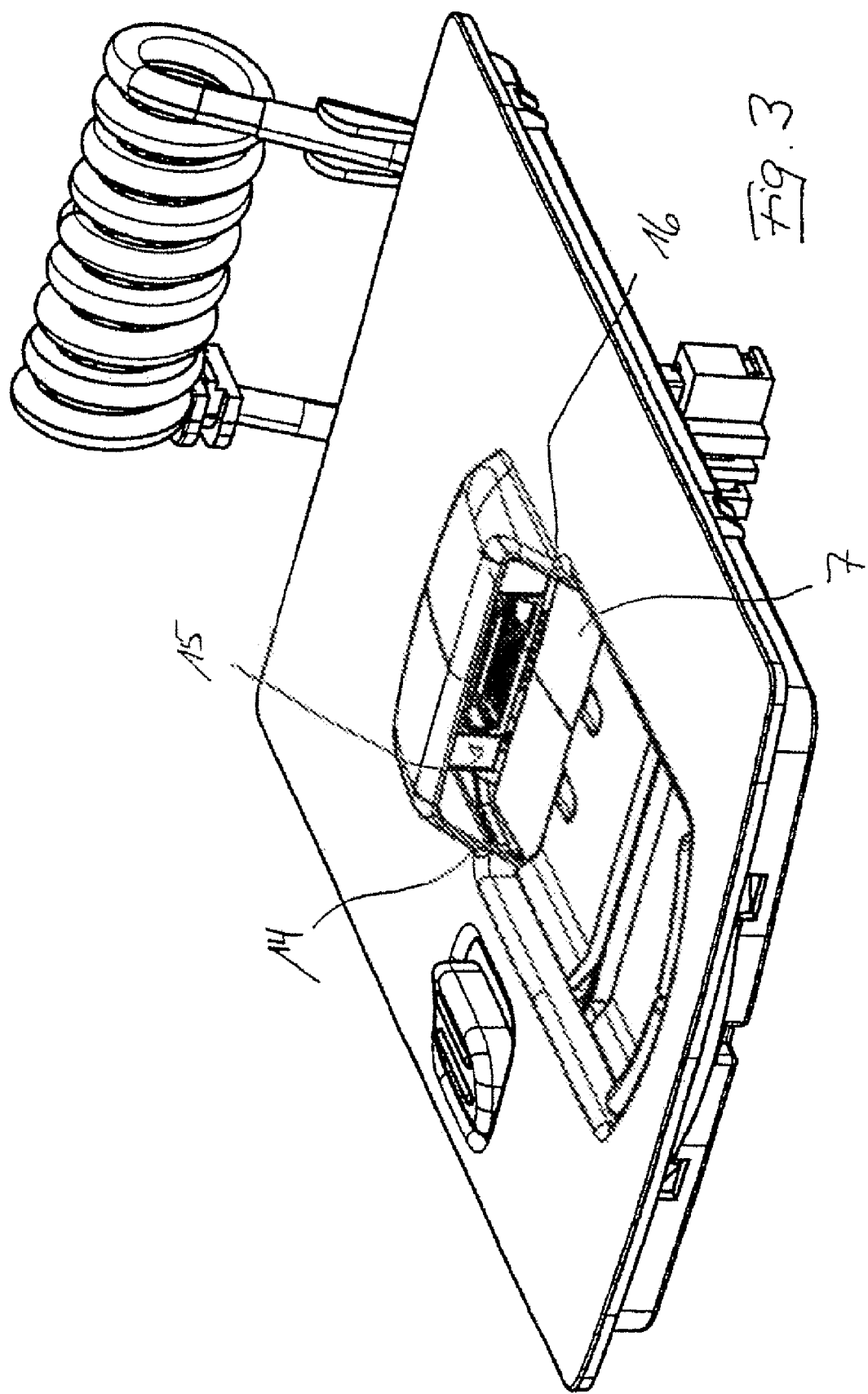
FIG. 3 shows a view of the mount according to FIG. 2 obliquely from above such that the opening of the contact chamber is visible.

As FIG. 3 illustrates, the obliquely positioned flap 7 can be pivoted downward, that is to say into the plane of the base 2, about the axis of rotation 8, in order thus to release an opening 14 of a contact chamber 15, in which mating contacts 16 are located.

Figure 4:
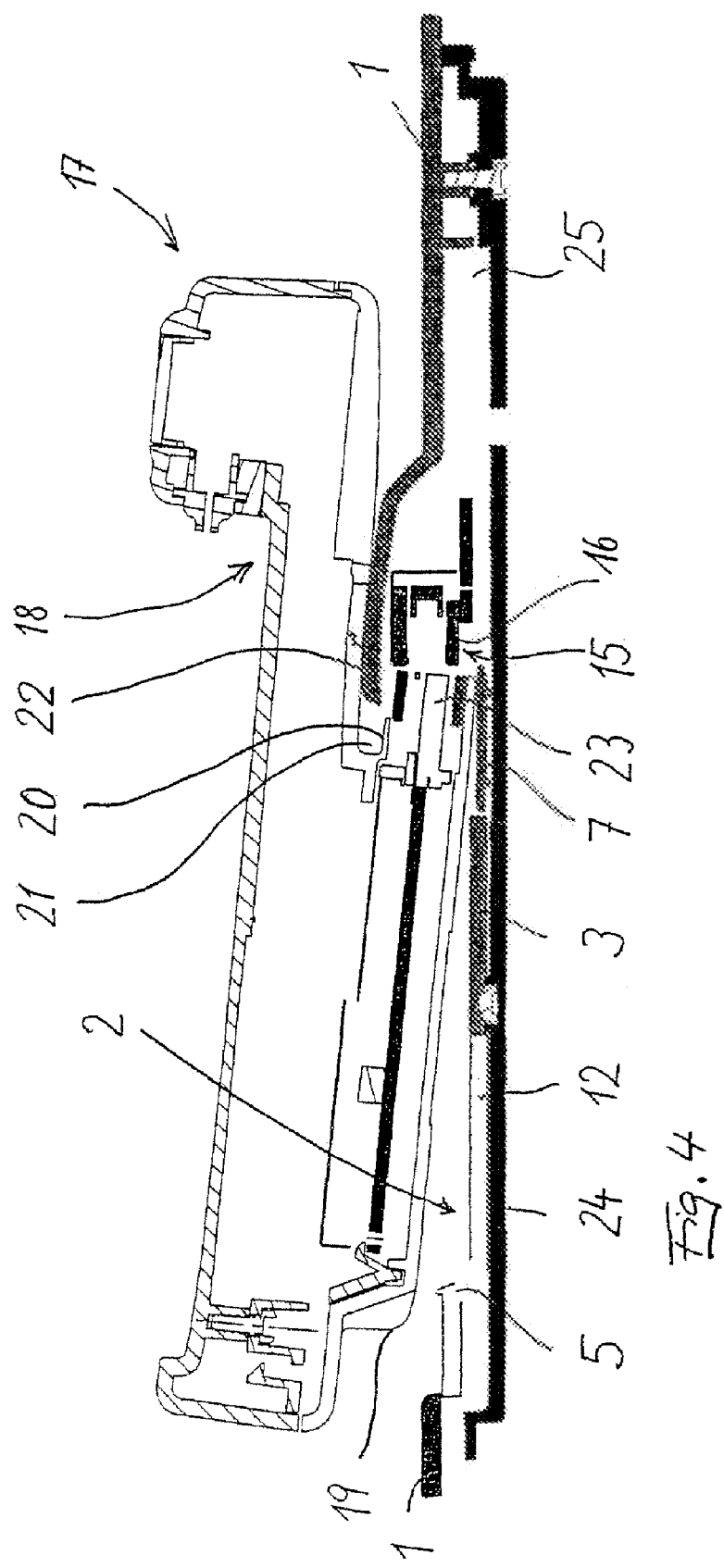
FIG. 4 shows a longitudinal section through the mount according to FIG. 1 and through a phone holder positioned obliquely thereon.

FIG. 4 shows a longitudinal section through the mount according to FIGS. 1 to 3 and through a phone holder 17 which, on its front side, has an accommodating pocket 18 for a cell phone. The phone holder 17, furthermore, is provided with a rear housing part 19, of which the dimensions correspond to the dimensions of the recess 2 in that position of the displaceable wall component 5 which is illustrated in FIGS. 2 and 3. The housing part 19 is continued by an extension 20 which forms, with the housing of the phone holder 17, an interspace 21 in which a top wall 22 of the projecting structure 6 can engage.

Contacts 23 of the phone holder 17 are located in the extension 20. The mating contacts 16, which are arranged in the contact chamber 15, are designed for contact-connection with the contacts 23.

FIG. 4 shows that the phone holder 17 cannot be moved into its proper position, in which it has its rear side located parallel to the base 3 of the recess 2, because in its initial position, as is illustrated in FIGS. 1 and 4, the wall component 5, which rises up from the base 3, prevents this orientation of the phone holder 17. The dimensioning of the extension 20, of the interspace 21 and of the spacing between the top wall 22 of the projecting structure 6 and the base 3 means that, in the oblique position illustrated, contacts 23 cannot be brought into contact with the mating contacts 16.

Rather, what is necessary here is for the wall component 5 to be pushed away from the contact chamber 15 until it butts against the covering plate 1. The phone holder 17 can then be oriented parallel to the base 3 by way of its rear side, and the extension 20 can be pushed into the contact chamber 15 to the extent where the contacts 23 come into contact with the mating contacts 16 and establish the electrical connection. In the pushed-in position, the wall component has been set back, on account of spring loading, into the initial position, which is illustrated in FIGS. 1 and 4. By virtue of the flap 7 being pushed down into the plane of the base 3, the displaceable wall component 5 is locked, preferably in the region of the base component 12 connected integrally to it, so that the inserted phone holder 17 cannot be removed from the mount on account of the extension 20 projecting into the contact chamber 15 and of the extension 20 being prevented from being pulled out of the contact chamber 15 by the locked wall component 5. For removal purposes, it is necessary to release the locking of the wall component 5 using the unlocking button 9, so that the situation where the phone holder 17 accidentally drops, or is pushed, out of the mount is reliably prevented.

FIG. 4 shows that the opening-closing flap 7 is pushed into the plane of the base 3 by the insertion of the extension 20 and there is thus no need for any additional installation space for the purpose of lowering the covering of the opening 14 of the contact chamber 15.

Accordingly, a housing wall 24 may be fitted directly beneath the base 3. The space 25 between the housing wall 24 and the covering plate 1, this space being located beneath the contact chamber 15, is sufficient for the electronics provided for the mount to be accommodated as an interface between a central control means and the phone holder 17 and, if appropriate, operating elements. The overall height of the mount is thus made up of the depth of the recess 2 and of the material thickness for the base 3 and the housing wall 24.

The invention claimed is:
1. Mount and phone holder comprising:
a phone holder having
a rear projecting housing part with an extension provided with contacts, and
on its front side, an accommodating pocket for a cell phone; and
a mount for said phone holder, said mount having
a recess which accommodates a rear housing part of said phone holder,
a contact chamber adjoined to said recess which has an opening on one side, wherein said contact chamber contains mating contacts,
wherein said extension of the housing part of said phone holder can be pushed into said contact chamber of said mount for establishing contact-connection between the contacts of the phone holder and the mating contacts of said contact chamber,
wherein said housing part is insertable into the recess of said mount,
a displaceable wall component which bounds the recess of said mount on a side located opposite the contact chamber, said displaceable wall component allows the housing part of said phone holder to be introduced into the recess of the mount, such that the housing part of said phone holder butts against a base of the recess only when the wall component has been displaced counter to a spring force,
wherein said displaceable wall component can be blocked in terms of displaceability by a locking device in a position which corresponds to the position of the displaceable wall component with the extension of the phone holder inserted into the recess of the mount and pushed into the contact chamber to the contact-connection state, and
a covering of the contact chamber, said covering extends over the opening of the contact chamber can be pushed down by the phone holder to so as to achieve a pushed-down state which uncovers the opening of the contact chamber of the mount,
wherein locking is activated by the locking device when the covering is in the pushed-down state, wherein said covering is formed by a flap which is pivotable and which is initially obliquely positioned with respect to said base, said flap is mounted in a pivotable manner on the base of the recess of the mount, whereby the opening of the contact chamber of the mount can be uncovered by virtue of the flap being pivoted into the plane of the base.

2. The mount and phone holder of claim 1, wherein the contact chamber of the mount is dimensioned such that the extension of the housing part of the phone holder can only be introduced when the housing part, following displacement of the wall component, is oriented parallel to the base.

3. The mount and phone holder of claim 1, wherein locking with the locking device can be is controlled by the pivoting of the flap.

* * * * *